United States Patent
Jain et al.

(10) Patent No.: US 10,608,976 B2
(45) Date of Patent: Mar. 31, 2020

(54) DELAYED PROCESSING FOR ARM POLICY DETERMINATION FOR CONTENT MANAGEMENT SYSTEM MESSAGING

(71) Applicant: Dropbox, Inc., San Francisco, CA (US)

(72) Inventors: Aditi Jain, San Francisco, CA (US); Manveer Singh Chawla, San Francisco, CA (US); Thomas Berg, San Francisco, CA (US); Swapnil Zarekar, San Francisco, CA (US); Robert Kajic, San Francisco, CA (US); Karandeep Johar, San Francisco, CA (US); Aaron Feldstein, San Francisco, CA (US); Walter Kim, San Francisco, CA (US); Joe Nudell, San Francisco, CA (US); Jenny Dong, San Francisco, CA (US); Jared Wilson, San Francisco, CA (US); Luke Thompson, San Francisco, CA (US); David Kriegman, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 182 days.

(21) Appl. No.: 15/793,787

(22) Filed: Oct. 25, 2017

(65) Prior Publication Data
US 2019/0124033 A1 Apr. 25, 2019

(51) Int. Cl.
*H04L 12/58* (2006.01)
*H04L 29/06* (2006.01)
*H04L 29/08* (2006.01)
*G06F 9/50* (2006.01)

(52) U.S. Cl.
CPC ............ *H04L 51/26* (2013.01); *G06F 9/5038* (2013.01); *H04L 51/36* (2013.01); *H04L 63/102* (2013.01); *H04L 67/22* (2013.01)

(58) Field of Classification Search
CPC ......... H04L 67/26; H04L 51/04; H04L 51/26; H04L 63/102; H04L 67/22; G06F 9/5038
See application file for complete search history.

(56) References Cited

U.S. PATENT DOCUMENTS

| | | | |
|---|---|---|---|
| 9,420,002 B1 * | 8/2016 | McGovern | H04L 63/10 |
| 9,813,285 B1 * | 11/2017 | McGovern | G06F 21/316 |
| 2013/0124713 A1 * | 5/2013 | Feinberg | G06F 11/0769 709/224 |
| 2018/0077025 A1 * | 3/2018 | Helvey | H04L 67/125 |

* cited by examiner

*Primary Examiner* — Mohamed A. Wasel
(74) *Attorney, Agent, or Firm* — Hickman Palermo Becker Bingham LLP

(57) ABSTRACT

Computer-implemented techniques include, during a delayed processing window, receiving reward data for arm actions taken, where the arm actions were chosen based on a previous version of an arm choice policy, and the previous version of the arm choice policy was determined based on a previous set of reward data for a previous set of arm actions taken. When the delayed processing window has closed, a new arm choice policy is determined based at least in part on the action-reward data, and the previous set of reward data and/or the previous arm choice policy. After a request to choose an arm choice is received, a particular arm action to take is determined based on the new arm choice policy. This chosen arm is provided in response to the request.

21 Claims, 4 Drawing Sheets

DELAYED PROCESSING FOR ARM POLICY DETERMINATION FOR CONTENT MANAGEMENT SYSTEM MESSAGING

FIELD OF THE INVENTION

The present invention relates to messaging for content management systems, and in particular to delayed processing for arm policy determination for content management systems messaging, where each "arm" may be a choice among possible actions to take within a policy for a content management system. This is described in detail below.

BACKGROUND

The timing of actions taken with respect to user emails and prompts can affect how well those emails or prompts are received. Consider an example where a user has gone over a threshold quota for a particular resource (e.g., memory) that is available to a free account. The provider of the service may want to send an email to the user requesting that the user upgrade her account so that she can increase the memory available to her. The timing of the sending of that email can be critically important. For example, if that email is sent toward the end of the work day, then the user may already be swamped in emails and the email may eventually get buried.

Techniques described herein address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for delayed processing for arm policy determination for content management system messaging, including, while a delayed processing timing has not been met, receiving reward data for arm actions taken as a first set of action-reward data, where the arm actions were chosen based on a previous version of an arm choice policy, and the previous version of the arm choice policy was determined at least in part on a previous set of reward data for a previous set of arm actions taken. When the delayed processing timing has been met, a new arm choice policy is determined based at least in part on the first set of action-reward data, and the previous set of reward data for the previous set of arm actions taken and/or the previous version of the arm choice policy. After a request to choose an arm is received, a particular arm action to take is determined based at least in part on the arm choice policy. This chosen arm is provided in response to the request. In some embodiments, the techniques further include performing the determined particular arm action.

In some embodiments, while a decision batch timing has not been met, multiple requests for choice of arm to be taken are received, and after the decision batch timing has been met, corresponding arm actions to be taken in response to each request are determined based at least in part on the new arm choice policy. In some embodiments, statistical variance in the new arm choice policy is used during the determining of the arm choice and/or reward data is determined based on passage of a particular timeout period.

In some embodiments, multiple, ranked arms choices are determined in response to the received request and the choice of action to take is based at least in part on ranking of the multiple, ranked arms.

In some embodiments, the first set of action-reward data includes first context data for the arm actions taken. The new arm choice policy is determined based at least in part on the first set of action-reward data that includes the first context data. Then the embodiments may proceed by receiving context data as part of the request and determining the particular arm action to take includes determining the particular arm action to take based at least in part on the arm choice policy and the context data.

In some embodiments, the techniques include receiving reward data for previous arm actions during a batch window, where the previous arm actions were chosen based on a previous arm policy and the previous arm policy was chosen based on a previous set of arm choice-reward data. Arm choice-reward data for the reward data for previous arm actions received during the batch window is determined. After the batch window closes, a new arm choice policy is determined based at least in part on the first set of arm choice-reward data and either or both of the previous set of arm choice-reward data for the previous set of arm choice-reward data and the previous arm policy. In response to a received request for an arm action to take, a particular arm action to take is determined based at least in part on the arm choice policy, and is then provided in response to the request.

The techniques also include, while a batch window timing has not been met, receiving action-reward data, where the action-reward data is associated with arm actions chosen based on a previous version of an arm choice policy, and where the previous version of the arm choice policy was determined at least in part on a previous set of action-reward data for a previous set of arm actions taken. When the batch window timing has been met, a new arm choice policy is determined based at least in part on the first set of action-reward data, and one of the previous set of action-reward data for the previous set of arm actions taken and the previous version of the arm choice policy. Based on a received request for an arm from among arms in the new arm choice policy, the choice is determined and provided based at least in part on the arm choice policy.

DETAILED DESCRIPTION

Figure 1:
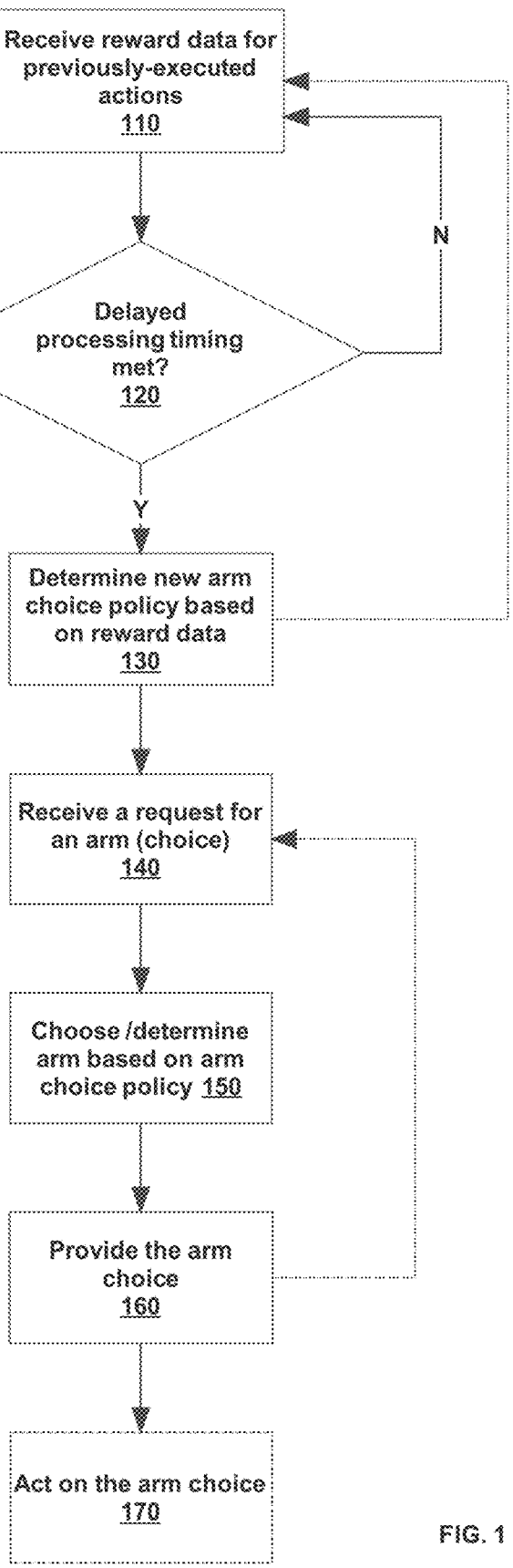
FIG. 1 depicts an example process for delayed processing for arm policy determination.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The timing and content of user and customer communications can be vitally important to the success of those communications. Unfortunately, one cannot know beforehand what timing or content will be successful. So, experimentation is needed. Along with the need for experimentation, there is a need for successful communications. Techniques herein balance the need to experiment with the need to have success in the communication (exploit), using a delayed grouping (batch) processing of previous choices and corresponding results (rewards). At each processing of a delayed grouping, a new distribution policy is made. In the policy, each possible choice of action is termed an "arm" of the distribution policy, be it exploitation or experimentation. After the delayed processing, the new arm distribution policy is used to choose the actions to be taken.

As an example of the problem addressed by the techniques herein, consider emails (or prompts) offering users a chance to upgrade account types (e.g., from a free account to a paid, professional account) upon exceeding a quota of free space available to the user in a collaborative or online content management system. The content management system may allow users to store, access, and share many types of content, digital data, photos, text, audio, video, streaming content, etc. Such content can be of varying and sometimes very large sizes. It is very difficult for a user to track the overall usage of storage without the help and guidance of the online management system. Thus, in storing such data, users may easily overrun quotas associated with their content management system accounts. As such, appropriately-timed emails and prompts with appropriate content are very important. The correct timing and content of these messages are not only important for the content management system operators, which may get users to upgrade accounts, but also to users who will be able to continue to use the content management service with little or less disruption notwithstanding going over quota. If such an email is sent in the middle of the morning, it might be "buried" in the user's inbox with all the other emails coming in during the day. There may be better times to send those emails. The techniques provide for better exploitation of known beneficial times to send those emails as well as exploration of other times to send those emails. Further, as alluded to above, the techniques apply to more than just emails send times. They can be used for any type of decision, such as content of a communication (email, operational message, prompt, etc.) timing of information (day, week, immediacy, etc.), and the like. Prompts may be pop-up windows, content displayed in a particular area or widget, etc. within a program or on a web page.

The techniques herein use a multi-armed bandit approach in which, among many choices made, multiple options (or "arms") are used. Each arm may be associated with a known or expected "reward" (however the reward may be defined for the type of optimization being performed) based on prior attempts of the arm. Those expected rewards can be used to attempt to maximize total reward across the users while still exploring some of the arms that do not have as high of an expected reward. Over time, this balance of exploration (choosing arms that may not have the highest expected reward) and exploitation (choosing the arm(s) with the highest expected reward) will provide a balance of increased reward as well as increased knowledge of which arms provide the best rewards.

The techniques proceed by receiving batched data from many previous decisions (e.g., time periods of when to send users upgrade emails). For example, thousands of decisions may have been made on a previous day and the effect of all of those may be processed at one time to create a new policy to be used for decision making going forward. Further, in cases such as over-quota email example where decisions to send are made in batch, not only is the policy creation batched, but the decision making may also be batched. Where the decisions to be made are not batched (e.g., closer to realtime such as in an operational message or prompt context), the updating of the policy may still be batched.

The techniques herein may rely on using a distribution (e.g., Gaussian, binomial, etc.) of the expected reward associated with each arm or a distribution of the parameters used to estimate the reward from context data to ensure that all batched decisions do not necessarily end up being made identically.

Example Processes for Delayed Processing for Arm Policy Determination

FIG. 1 illustrates a process for delayed processing for choice policy determination. In summary, the process proceeds by determining 130 new arm choice policies based on reward data received 110 during a delayed processing window. Once a request for an arm choice is received 140, a determination 150 may be made as to which arm to choose for the request. This arm choice will then be provided 160 in response to the request. In some embodiments, the process will continue by acting on the arm choice.

As an example, consider the batch processing of upgrade offer emails to be sent to users. These emails might be sent after a user nears, hits, or exceeds a quota of free space (or other resource). The timing of those emails, as discussed elsewhere herein, may influence how successful those emails are in getting users to upgrade from one type of account (e.g., a "free account") to another type of account (e.g., a "pro account"). Process 100 may be used to experiment with timing of those emails in addition to exploiting what is believed to be the best timing for those emails. The system depicted in FIG. 3 (and/or the hardware in FIG. 4) may be used to implement process 100, process 200 and other embodiments herein.

As another example, a system may provide users with prompts at certain times and in certain contexts. For example, the prompts may ask a user whether she would like to upgrade (e.g., based on being over quota, or other context). The processes 100 and 200 and system 300 may be used to determine appropriate prompts, timing, etc. for that user.

In many of the examples herein, the arms in the arm policy are periods of time (e.g., one- or four-hour blocks in local time for the user in question). In some embodiments, the arms may include more variables and/or there may be more possible arms. For example, the arms may include one-hour chunks and the day of the week, producing one hundred sixty-eight total arms. Further, arm choices may include types of messages (e.g., emails sent, prompts given, etc.). For example, if the arms were four-hour blocks, on the day of the week, and were one of five possible emails there would be two hundred and ten total arms. In the example where possible prompts given are arms, then the number of possible arms may be the number of possible prompts multiplied by any choices for any other variables (such as size, duration, and delay of the prompt).

Returning to the top of process 100, reward data is received 110 for a previously-executed action. Receiving data may take any appropriate form. In some embodiments, data may be received from another system, may be received by another process, function, etc. within the same system, may be received in a shared memory spaces, such as a database, directory, etc. For example, an arm request system 330 may have previously requested arm actions to be taken (e.g., over-quota emails to be sent, or prompts to be made for users), and reward data may be received 110 indicating the outcomes of those previously taken arm actions. The reward data and associated prompt may be stored in attached storage, cloud storage 340, or 341, at storage local to receiving system 310, 320, or 330, or in any other appropriate location.

Associating received 110 reward data with a particular previous request may include using an attribution for previously-taken arm actions. This can be important when it might otherwise be ambiguous what arm action was associated with the received 110 reward data. For example, if a user is given multiple messages (e.g., shown multiple prompts and/or sent multiple emails) by system 330, then it may be difficult to know to which message to attribute any received 110 reward data. In some embodiments, attribution is done by attributing the only message sent during a particular time period to the reward. For example, if only one email or prompt was sent to a user asking the user to upgrade accounts, then an upgrade for that user would be attributed to that single email or prompt. As another example, if only one prompt or email related to upgrading accounts was given during a particular time period (e.g., one week), then the received reward data may be attributed to that email or prompt.

Figure 3:
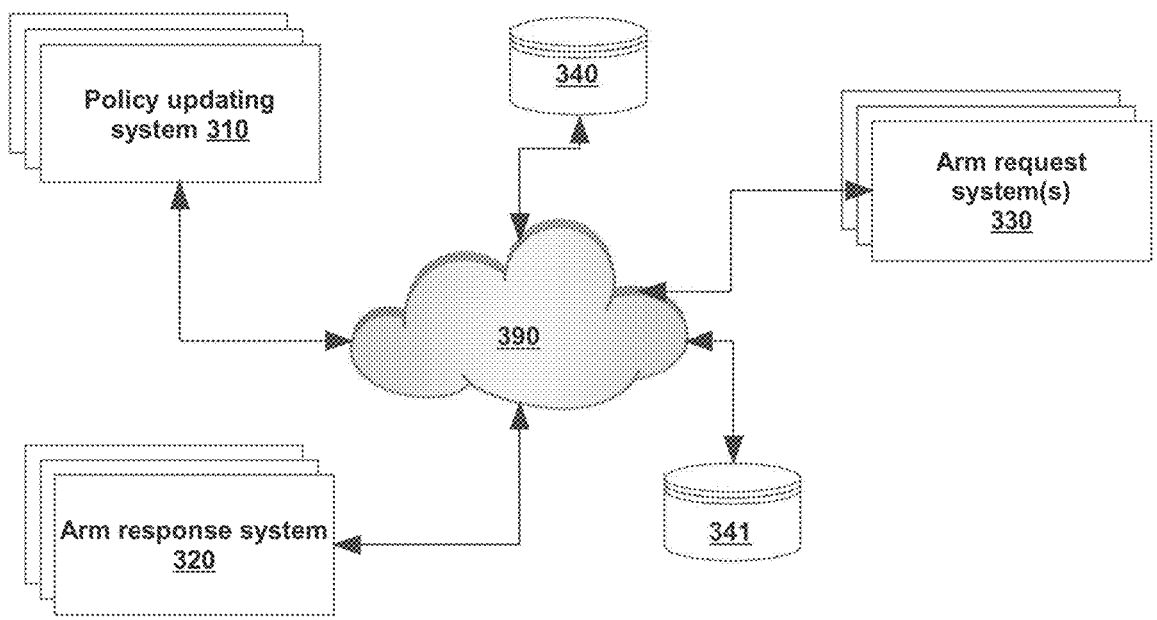
FIG. 3 depicts an example system for delayed choice policy determinations.

Turning briefly to FIG. 3, which is discussed more below, note that the various systems 310, 320, and 330 are discussed as three separate entities for simplicity. Two or more of system 310, 320, and 330 may be implemented as the same system and/or any of systems 310, 320, and 330 may include multiple systems. For example, arm request system 330 may be implemented as a system for requesting arm actions to be taken, and separately a system or service that acts on those requests. In the over quota email example, the arm request system 330 may be implemented as a drone job that occasionally checks for over quota accounts (e.g., every hour or two), and then sends a request to schedule an email to send to over quota users. That request may go to the arm response system 320, which will then reply with a proposed schedule to an email scheduling system (not pictured separate from arm request system 330). The email scheduling system may send the email itself, or it may have that email sent at the specified time by another system (not pictured separate from the arm request system 330). Further, prompts may be sent to a user on a web property, in a mobile application or the like (not depicted in FIG. 3).

Reward data may be received 110 in one form and stored in another form. In some embodiments, the received reward data may be an indication of an action taken (or not taken) by a user. The stored reward data may represent the action or inaction numerically or in any appropriate form. For example, a policy updating system 310 (or any other system 320, 330) may receive an indication that a particular user upgraded accounts. Therefore, the policy updating system 310 may store an indication of "1.0" related to a previously-sent upgrade email.

In some embodiments, indicating inaction by a user, which may be lack of success of a taken arm action, may be related to a low or negative reward. Further, such inaction may be determined by a timeout. For example, if an upgrade prompt or email is delivered to a user, then, if the user does not upgrade within a certain time period (e.g., one, two, or three days, a week, a month, etc.), then the techniques herein may indicate that the email or prompt was not a success and the timeout may be associated with a low or negative reward. The timeout information may be received 110 from another system or otherwise determined by the system itself (not depicted in FIG. 1).

In some embodiments, there may be more than one type or level of reward. Consider the example of sending an upgrade email. If an email is sent to a user after the user has gone over quota, then the reward structure for the email may be varied or tiered based on actions the user may have taken. If the user upgraded, then a 1.0 may be attributed to the email/action. If the user clicked on a link in the email and navigated to the site, then a 0.5 may be attributed to the email. If the user opened the email, but did not click a link, then a 0.2 might be attributed to the email. If the user did not even open the email, then a 0.0 might be attributed to the email. As noted above, in some embodiments, the inaction related to not opening an email may be attributed if a timeout period has been met. Other reward metrics that may be considered include actual cash value (e.g., of conversion of account types, of prompt response, etc.), type of account upgraded to (e.g., upgrading to a lower cost "Lite" account may be a reward value of 1.0 and upgrading to a more feature rich "Pro" account may have a reward value of 1.33), whether payment is annual or monthly, etc.

In some embodiments, receiving 110 a reward may include receiving click-through data. For example, using the prompt example, if the user clicks on a prompt, then the reward data may be logged based on that click. For example, returning to the prompt example, if the user clicks on a prompt and upgrades accounts, then the reward may be received 110 based on interpreting the upgrading the account as being attributed to the previous prompt (arm action). In some embodiments, receiving 110 reward data may be delayed and/or may be based on log data. For example, the data related to messages (actions) and/or clicks and other types of rewards may be stored in one or more log files and the association of reward data with actions may be based on reviewing that log data. Receiving 110 such reward data is delayed since it occurs after that reviewing of the log files.

If the delayed process (or batch) timing has not been met 120, then process 100 will continue to collect reward data until the timing is met 120 (as depicted by the arrow from 120 to 110). In some embodiments, the delayed process timing is not met during a "batch window." The delayed process or batch window timing may be any appropriate time period, such as one day, one hour, one minute, etc. In some embodiments, meeting 120 the batch timing may include the passage of a particular amount of time since the end of the previous delayed process period, or may be met by a certain real-world time (e.g., every 4 clock hours; or at 6 am, 9 am, noon, 3 pm, 6 pm, and midnight, etc.). In some embodiments, meeting the batch timing may also include receiving 110 a predetermined number reward data-action pairs. For example, in order to meet 120 the delay processing timing, both a particular amount of time has to have passed and a certain number of requests have to be received. In some embodiments, meeting 120 the delayed batch timing may include only receiving 110 a certain number of requests, without a requirement for the passage of a certain amount of time.

Returning to the quota email timing example, the success or failure (reward) data for previously-sent emails may be received 110 until a delayed processing timing is met 120. The timing might be met 120 when a twenty-four-hour period has elapsed. Before that timing is met 120, more reward data for previous emails may continue to be received 110.

If the delayed process (or batch) timing is met 120, then process 100 will proceed by determining 130 a new arm policy based on the reward data received during the delayed processing window. In some embodiments, determining the new arm policy includes matching each of the received rewards with an action taken. Matching the rewards with actions is described elsewhere herein and may occur as part of determining 130 a new arm policy, receiving 110 the rewards data, or in any other part of the process 100, whether depicted or not. In some embodiments, the reward-action pairs in the batch (those received 110 during the delayed processing window) may be used to determine the new arm policy, as may previous arm-action pairs and/or previous arm policies.

In some embodiments, an initial arm policy can be a hand designed function, and determining 130 a new arm policy may be made to reflect how well the previous arm policies performed compared to alternatives. The information used to train the arm policy is the combination of context, the chosen action and the reward. In some embodiments, this is grouped into a triple $d=<x, a, r>$, where x is the context, a is the action, and r is the reward, and the policy is updated based on a batch of N triples $D=[d, \ldots, d]$. The new arm policy ($\pi$) is then created based on the current policy and the batch, $\pi=L(\pi, D)$ where $L(\ )$ is the notation to denote learning a new arm policy based on a previous arm policy and batch D.

In some embodiments, there are variants on updating the policy (and correspondingly, referring to FIG. 3, on the policy updating system 310). A batch D may be just the data that was acquired between time t and t+1, or it may be all data before time t+1 (e.g., if may be just the data from the most recent batch or all data that has been received). The simplest batch size contains just one triple $D=[<x, a, r>]$. In some embodiments, incremental policy updating is used, by operating on data between time t and t+1 and updating the prior arm policy $\pi$. In some embodiments, a policy updater that operates on all the data may not use the previous arm policy $\pi$ to determine the new arm policy (e.g., $\pi=L(D)$, where D contains the reward data from all time).

In some embodiments, there is an initial arm policy $\pi$. This initial arm policy may provide a simple, even distribution over the possible arm actions taken, may be based on log data, may be hand curated, may be randomly seeded, or may take any appropriate form. For example, in some embodiments, logged data with triples $<x, a, r>$ can be used to initialize the bandit. Further, it may be that data was acquired from a different policy, it can be used to create an initial policy as long as logged features (contexts), actions, and rewards are compatible (e.g., meaning and/or statistics).

In some embodiments, determining 130 the new arm policy also includes determining a new arm model associated with the arm policy. An arm model may define the associated arm policy and may be referred to as a model and will be denoted as m. In some embodiments the arm model is a lookup table, weights of a linear or logistic regressor, etc. In some embodiments, the arm model (and arm policy) are saved each time they are created/updated. This can be beneficial, so that the models can be examined or applied to logged data.

In various embodiments, the arm model is what is executed and the policy defines the model. In other embodiments, the policy may itself be executable and used for execution. For simplicity in discussion herein, the policy will be referred to as both the function used to determine which action to suggest or take based on the context, and the executable model.

In some embodiments, determining 130 a new arm policy may include performing Thompson sampling on the data under consideration (e.g., data from the most recent batch and possibly data from previous batches). The probability distribution from the Thompson sampling may be based on counts or rewards, how many times actions taken were successful/unsuccessful, or any appropriate measure. The Thompson sampling may be done with beta distribution or with any other appropriate distribution. Using Thompson sampling to determine the new arm policy may have benefits in that it may provide for a desirable balance between choosing arms that are of high value (exploitation) as well as ensuring some distribution across all arms (exploration).

In some embodiments, the arm policy generated by the Thompson sampling may be varied or sampled in order to introduce a variety or distribution in the actions suggested or taken (and the related contexts where applicable) based on the arm policy. For example, if the Thompson sampling produces an arm policy that indicates a local time of day (e.g., in 4-hour blocks) for sending an upgrade email, then the policy might also have a sampling built in (or later introduced) that will allow for variation in what the arm policy indicates. This variability might also be introduced at another time in process 100, such as when an arm is being chosen or determined 150 (described elsewhere herein).

In some embodiments, the arm policy is determined 130 or updated using an epsilon greedy distribution. Updating the arm policy based on an epsilon greedy algorithm may include updating the arm policy to choose the best arm a large percentage of the time (1-epsilon) and choosing a different arm epsilon percent of the time. Epsilon may be any number, such as 0.02, 0.1, 0.32, etc. The choice among other arms (those chosen epsilon percent of the time), may be done using a random distribution among the arm that do not produce the highest reward, or using any of the techniques herein, such as Thompson sampling or upper confidence bound. In various embodiments, the arm policy may be updated using Thompson sampling with a linear or logistic model, a deep neural network model, or any other appropriate technique or algorithm.

In some embodiments, upper confidence bound may be used to determine 130 the new arm policy. Use of the upper confidence bound may include updating the policy to choose actions based on the upper end of the error bound for observed rewards for actions chosen. Using the upper confidence bound to update the arm policy may be beneficial when it is important to have the arm policy act "optimistically." When the optimism was justified, the arm policy will be choosing actions with high return on reward. When the optimism is not justified, actions that were believed to have a high reward would be taken, but when they are not in fact associated with high rewards, the learner will learn what is the true payoff of this action and not (likely) choose it in the future. In some embodiments, using the upper confidence bound to determine the new arm policy may be beneficial in circumstances where there is more context in the choice of arm action to take.

Figure 2:
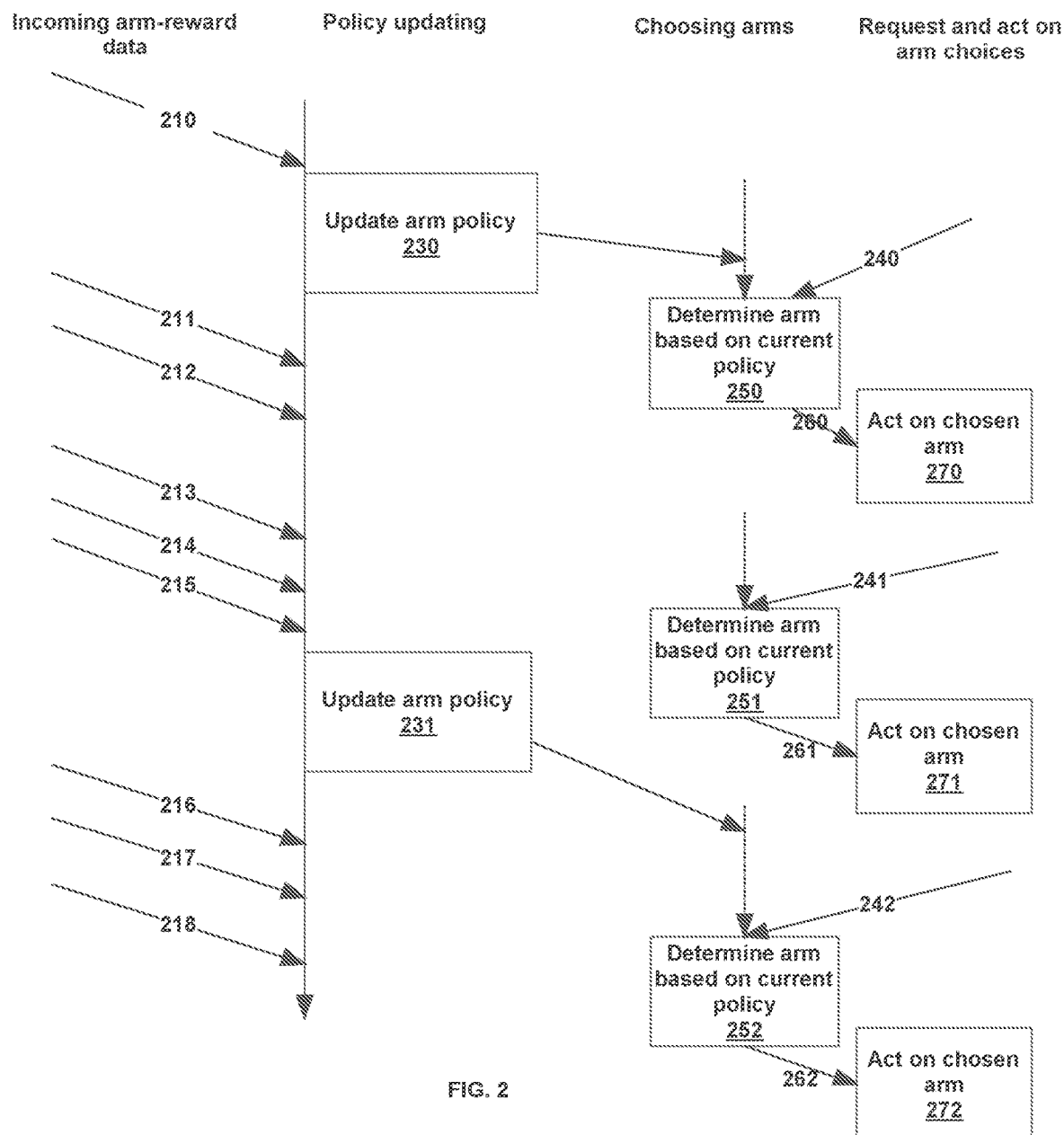
FIG. 2 depicts a second example process for delayed processing for arm policy determination.

In some embodiments, over time, the delayed processing window will close multiple times, each time a new policy will be determined 130. In many embodiments, multiple requests for arm choices are received 140 during each delayed processing window, but in some embodiments or circumstances multiple delayed processing windows may close before the next request for an arm choice is received 140. This is depicted in FIG. 2 and described elsewhere herein.

Receiving 140 the request for arm choice may include receiving an indication that an arm choice is needed. In some embodiments, the request for an arm choice may be received 140 along with context that defines important information about the request. For example, in the prompt example, the context received may include the percent of quota used, quota size, location of user, time of day, and number of apps installed (where the apps installed may refer to apps that can access the storage in the quota), and the like. In some embodiments, the context may also include what platform the user accessed the data from (web or mobile device), the last action taken by the service (e.g., page load, etc.), the type of files stored, information about the user (e.g., profession), last action taken by the user (e.g., uploading a new file, deleting a file), timing of last action taken by user (e.g., did the user just click or has the user been inactive for seconds or minutes), whether the app or webpage is the current focus (e.g., is the webpage "on top" on the user's computer or is it buried), and the like. The context may be important for the timing and/or content of a message or prompt. For example, if the user is active during working hours, it may be assumed that the content management system is being used for work, and an arm with more work-focused messaging may be chosen. If the user stores and shares photos and videos using the content management system, then an arm with photo-sharing-focused messaging may be chosen. If it is clear from the context that the user is not currently interacting with the app or webpage for the content management system, the timing of a prompt may be delayed until focus has shifted back to the app or webpage associated with the content management system.

Requests may be received 140 from or on behalf of applications that are being used by users, from or on behalf of web pages that are being accessed by the user, from or on behalf of a content management system (e.g., from or on behalf of a system that checks on the quota status of users), and the like. For example, requests for arm choices may be received 140 from a system such as arm request system 330 of FIG. 3 on behalf of a user using an application, in order to provide that user a prompt; or on behalf of a system that has detected that a user has or is about to go over quota.

After the request for an arm choice is received 140, an arm choice may be determined 150 for response and it may be provided 160 in response to the request. Determining 150 an arm choice for the request may include using context associated with the request and the most recent arm policy (or arm model associated with the most recent arm policy). For example, if a request for email timing for an over-quota user has been received 140, then the most recently determined 130 arm policy may be used to determine 150 the arm to choose for the received 140 request. For example, it may be determined 150 that the over quota email should be timed to go out at 10:30 am.

In some embodiments, arm choices are determined 150 right away. In other embodiments, the arm choices are determined 150 in batches, with at least some being delayed with respect to the time the request was received. For example, in the prompt arm policy example, it may be the case that the determination 150 is made immediately so that the prompt chosen (the arm) can be displayed right away to the user. In embodiments where it is possible to batch together responses to requests, then the arms may be determined 150 at set intervals (e.g., determining 150 all of the arms needed, requests for which have been received 140 during that window). For example, in the email quota arm policy example, the determination 150 of when to send quota emails may be performed once per hour, day, etc., and all requests for arms received during that time period may be made at once, and using the same arm model.

As discussed elsewhere herein, in some embodiments, determining 150 arm choices based on received 140 requests may include introducing variability in the arm policy (or model). For example, if an arm model (that implements an arm policy) has coefficients in a vector that represents the element of the context of the request, then the coefficients may be sampled in order to introduce variability in the determinations 150 made using the arm model. This sampling may be beneficial in order to have variability in the arm policy's (or model's) determination across multiple requests that have the same (or similar) contexts. This may be advantageous in embodiments where the determinations 130 of new arm policies are batched since the policy may not change among many determinations 150 made for received 140 requests. Sampling may be accomplished by introducing small, random variations in the coefficients.

After the arm choice is determined 150, it may be provided 160 in response to the original request received 140. The response may be provided 160 by sending the response to the requester (e.g., in embodiments where the response is needed immediately, such as the prompt example), by writing the arm action to be taken to data storage (e.g., in embodiments where the responses have been batched, such as some embodiments of the over quota emails sends), or in any other appropriate manner. Responses may be provided 160 to the original requester or to a system or device that will act on the requests. For example, one system may determine that many users have gone over quota and send the related requests, and the response with email timing for those over quota emails may be provided 160 to another system that will schedule and/or send those emails.

In some embodiments, a ranking of multiple arm will be determined 150 in response to the original request received 140. The rank of the arms may be performed by determining the expected reward for multiple arms, and ranking the arms in the order of the expected reward. In some embodiments, the arms each correspond to prompts that have associated therewith a set of rules. The rules may be computationally and/or temporally expensive to evaluate. As such, the requesting system may request an ordered list (ranked list) of arms. This will allow the requester to proceed in evaluating the rules associated with the prompts in the order provided 160. This can be of benefit because the requester can then find an appropriate prompt with less computational or temporal cost.

Some embodiments include acting 170 on the arm choice (depicted as optional in FIG. 1). This may entail performing the action determined 150 and provided 160. For example, in some embodiments, instead of or in addition to a system providing 160 a response, it will send an email to users that are over quota at the determined 150 times.

In various embodiments, the arm policy changes over time based on new data related to arms performed and rewards observed. This can be beneficial (e.g., as compared to other techniques), because the needs the arm policy is addressing may change over time. For example, using the email quota or prompt examples, it may be the case that one month a certain quota email timing works best in a particular region, but as sunrise changes, the timing that works best might shift with the timing of sunrise.

Second Example Process for Delayed Processing for Arm Policy Determination

FIG. 2 depicts a second example process for delayed processing for arm policy determination. Much of the process 200 depicted in FIG. 2 is described elsewhere herein, including with respect to process 100 of FIG. 1. Therefore, for clarity, process 200 will be described primarily in a manner that the information it depicts differs from that described elsewhere herein.

Generally, FIG. 2 depicts the timing related to the arrival of arm reward data received 210-218, the updating 230, 231 of new arm policies, receiving 240-242 requests for arm choices, determining 250-252 the arms for those received requests, responding 260-262 to the requests, and acting 270-272 on the arm choices.

As depicted in FIG. 2, arm reward data can be received 210-218 at any time, at regular or non-regular intervals, etc. Arm reward data may be received in batches (not depicted in FIG. 2) or individually (depicted in FIG. 2). In some embodiments, the arrival of arm reward data may be independent of the updating 230 of the arm policy. As described elsewhere herein, in some embodiments, the arm policy may be updated 230 at regular or irregular intervals and/or based on the arrival of predetermined amounts or types of reward data. Updating 230 arm policies is described elsewhere herein, such as, for example, with respect to determining 130 the new arm choice policy from FIG. 1. As depicted in FIG. 2, received 210-218 reward data may be batched before the arm policy is updated 230-231. For example, received 210 reward data may be used to update 230 the arm policy; received 211-215 reward data may be used to update 231 the arm policy; and received 216-218 reward data may be used in a later update of the arm policy (not depicted in FIG. 2).

Each time the arm policy is updated 230, 231, the new arm policy may be used to determine 250-252 an arm choice for any received 240-242 request for an arm choice. Determining 250-252 an arm choice based on a received 240-242 request and an updated 230, 231 arm choice policy is described elsewhere herein, such as with respect to determining 150 of FIG. 1. As depicted in FIG. 2, the determination 250-252 may be made based on the most recent policy. So, e.g., responses to requests received 240 and 241 may be determined 250 and 251 based on the same policy (from update 230), but request 242, which is received after the next update 231 to the arm choice policy, may use that updated policy. In some embodiments, as depicted in FIG. 2, even though reward data may be received 211-214 before a request for an arm choice is received 241, since the policy has not been updated 231 based on that received 211-214 data, it may not be taken into account in the determining 251 of the arm action for the request.

As discussed elsewhere herein, in some embodiments, after the arm action has been determined 250-252, then the arm may be acted upon 270-271. Acting on chosen arms is described elsewhere herein, such as with respect to acting 170 in FIG. 1.

Example Systems for Delayed Processing for Arm Policy Determination

FIG. 3 depicts an example system for delayed processing for arm policy determination. The system depicted in FIG. 3 is just one embodiment of a system that may be used for delayed processing for arm policy determination. Other, simpler or more complex systems may be used. For example, the system may include a number of scripts or programs that run, and those scripts or programs may run on any of the depicted systems and/or on systems that are not depicted. For example, updating the arm policy as described herein may be performed by a policy updating system 310, or by another system 320 or 330, or another device or system not depicted in FIG. 3. As another example, request for arm choices may be received from system 330, which may generate such request, or system 330 may act on behalf of other systems or devices (not depicted in FIG. 3) in order to send requests. Further, arm response system 320 is depicted as separate from policy updating system 310, but the two may be, in some embodiments, the same system. Further, all systems 310-330 and storage 340-341 are depicted as separate from one another and communicatively coupled via network 390, but two or more (or all) of 310-341 may be implemented as the same system, server, or program.

Figure 4:
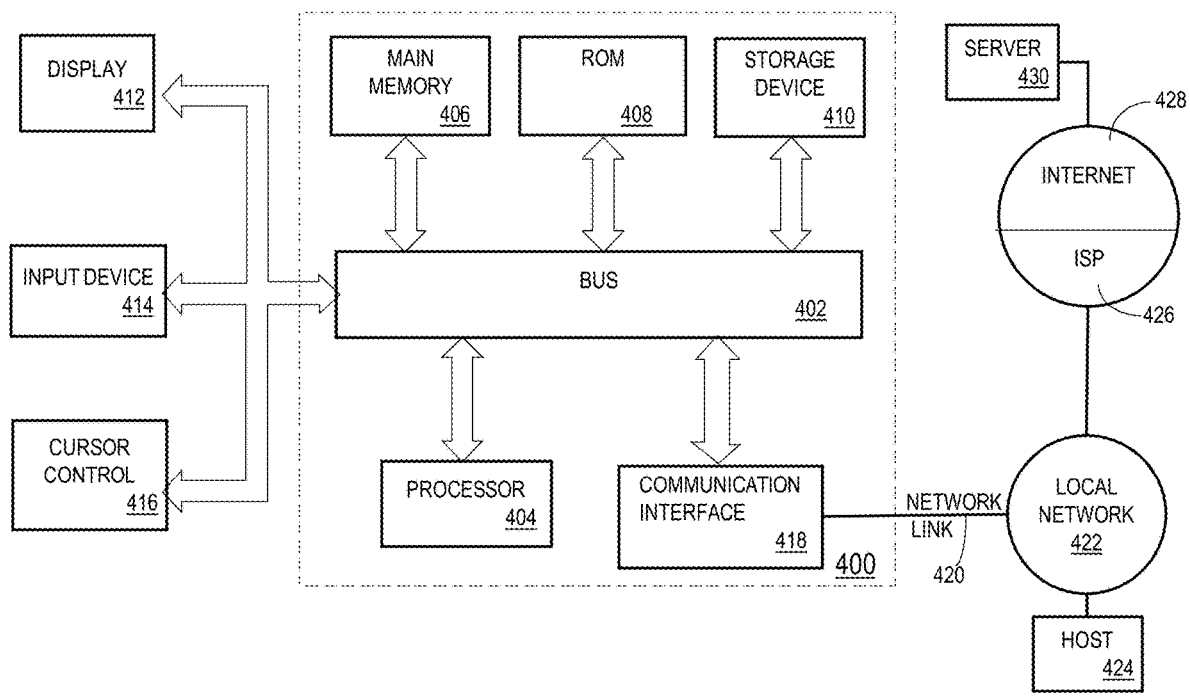
FIG. 4 depicts example hardware and configurations for delayed choice policy determination.

In some embodiments, the processes 100 and 200 of FIGS. 1 and 2 may run on the system 300 of FIG. 3 and/or the hardware 400 of FIG. 4. For example, the described functions of process 100 and/or process 200 may be performed by one or more of systems 310-330. Each system 310-330 may run on a single computing device, multiple computing devices, in a distributed manner across a network, on one or more virtual machines, which themselves run on one or more computing devices. In some embodiments, systems 310-330 are distinct sets of processes running on distinct sets of computing devices. In other embodiments, systems 310-330 are intertwined or share processes or functions and/or run on the same computing devices. In some embodiments, storage 340 and 341 are communicatively coupled to systems 310-330 via a network 390 or other connection. Storage 340 and 341 may also be part of or integrated with one or more of systems 310-330.

As discussed herein the various processes 100, 200, etc. may run in parallel, in conjunction, together, or one process may be a subprocess of another. Further, any of the processes may run on the systems or hardware discussed herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
while a delayed processing timing has not been met, receiving reward data for arm actions taken as a first set of action-reward data, wherein the arm actions were chosen based on a previous version of an arm choice policy, and wherein the previous version of the arm choice policy was determined at least in part based on a previous set of reward data for a previous set of arm actions taken;

when the delayed processing timing has been met, determining a new arm choice policy based at least in part on (1) the first set of action-reward data, and (2) one or more of the previous set of reward data for the previous set of arm actions taken or the previous version of the arm choice policy;

receiving a request to choose an arm from among arms in the new arm choice policy;

determining a particular arm action to take based at least in part on the new arm choice policy; and providing the particular arm action to be taken in response to the request;

wherein the method is performed by one or more computing devices.

2. The method of claim 1, further comprising performing an action of the determined particular arm action.

3. The method of claim 1, further comprising:
while the delayed processing timing has not been met, receiving multiple requests wherein each request of the multiple requests is for choice of arm to be taken; and
when the delayed processing timing has been met, determining one or more corresponding arm actions to be taken in response to each request, of the multiple request, based at least in part on the new arm choice policy.

4. The method of claim 1, wherein determining the particular arm action to take based at least in part on the new arm choice policy comprises using statistical variance in the new arm choice policy during the determining.

5. The method of claim 1, wherein receiving reward data for arm actions taken comprises receiving first reward data for a first arm action, wherein the first reward data was determined based on passage of a particular timeout period after the first arm action was taken.

6. The method of claim 1, further comprising determining multiple, ranked arms to take in response to the received request.

7. The method of claim 6, further comprising choosing which action to take based at least in part on ranking of the multiple, ranked arms.

8. The method of claim 1, wherein:
the first set of action-reward data comprises first context data for the arm actions taken; and
the new arm choice policy is determined based at least in part on the first set of action-reward data that includes the first context data for the arm actions taken; and
the method further comprises:
receiving second context data as part of the request, and
wherein determining the particular arm action to take comprises determining the particular arm action to take based at least in part on the new arm choice policy and the second context data.

9. A system comprising:
one or more computing devices;
memory; and
instructions, stored in the memory, and which, when executed by the system, cause the system to perform:
receiving, during a batch window, reward data for previous arm actions, wherein the previous arm actions were chosen based on a previous arm policy, and wherein the previous arm policy was chosen based on a previous set of arm choice-reward data;
determining a first set of arm choice-reward data based at least in part on the reward data for the previous arm actions received during the batch window;
after the batch window, determining a new arm choice policy based at least in part on the first set of arm choice-reward data, and at least one of: the previous set of arm choice-reward data for the previous set of arm choice-reward data or the previous arm policy;
receiving a request for an arm action to take;
determining a particular arm action to take based at least in part on the new arm choice policy; and
providing the particular arm action to be taken in response to the request.

10. The system of claim 9, further comprising instructions which, when executed by the system, cause the system to perform performing an action of the determined particular arm action.

11. The system of claim 9, further comprising instructions which, when executed by the system, cause the system to perform:
during the batch window, receiving multiple requests wherein each request of the multiple requests is for choice of arm to be taken; and
after the batch window, determining one or more corresponding arm actions to be taken in response to each request, of the multiple requests, based at least in part on the new arm choice policy.

12. The system of claim 9, wherein receiving reward data for previous arm actions comprises receiving first reward data for a first arm action, wherein the first reward data was determined based on passage of a particular timeout period after the first arm action was taken.

13. The system of claim 9, further comprising instructions which, when executed by the system, cause the system to perform determining multiple, ranked arms to take in response to the received request.

14. The system of claim 9, wherein:
the first set of arm choice-reward data comprises first context data for the previous arm actions; and
the new arm choice policy is determined based at least in part on the first set of arm choice-reward data that includes the first context data for the previous arm actions; and
the system further comprises instructions which, when executed by the system, cause the system to perform:
receiving second context data as part of the request, and
wherein determining the particular arm action to take comprises determining the particular arm action to take based at least in part on the new arm choice policy and the second context data.

15. One or more non-transitory media comprising instructions which, when executed by a system having one or more computing devices, cause the system to perform:
while a batch window timing has not been met, receiving a first set of action-reward data, wherein the first set of action-reward data is associated with arm actions chosen based on a previous version of an arm choice policy, and wherein the previous version of the arm choice policy was determined at least in part on a previous set of action-reward data for a previous set of arm actions taken;
when the batch window timing has been met, determining a new arm choice policy based at least in part on (1) the first set of action-reward data, and (2) the previous set of action-reward data for the previous set of arm actions taken or the previous version of the arm choice policy;
receiving a request to choose an arm from among arms in the new arm choice policy;
determining a particular arm action to take based at least in part on the new arm choice policy; and providing the determined particular arm action to be taken in response to the request.

16. The one or more non-transitory media of claim 15, further comprising instructions which, when executed by the system, cause the system to perform performing an action of the determined particular arm action.

17. The one or more non-transitory media of claim 15, further comprising instructions which, when executed by the system, cause the system to perform:
   while the batch window timing has not been met, receiving multiple requests wherein each request of the multiple requests is for choice of arm to be taken; and
   when the batch window timing has been met, determining one or more corresponding arm actions to be taken in response to each request, of the multiple requests, based at least in part on the new arm choice policy.

18. The one or more non-transitory media of claim 15, wherein determining the particular arm action to take based at least in part on the new arm choice policy comprises using statistical variance in the new arm choice policy during the determining.

19. The one or more non-transitory media of claim 15, wherein receiving the first set of action-reward data comprises receiving first reward data for a first arm action, wherein the first reward data was determined based on passage of a particular timeout period after the first arm action was taken.

20. The one or more non-transitory media of claim 15, further comprising instructions which, when executed by the system, cause the system to perform determining multiple, ranked arms to take in response to the received request and choosing which action to take based at least in part on ranking of the multiple, ranked arms.

21. The one or more non-transitory media of claim 15, wherein:
   the first set of action-reward data comprises first context data for the arm actions chosen; and
   the new arm choice policy is determined based at least in part on the first set of action-reward data that includes the first context data for the arm actions chosen; and
   the one or more non-transitory media further comprises instructions which, when executed by the system, cause the system to perform:
   receiving second context data as part of the request, and
   wherein determining the particular arm action to take comprises determining the particular arm action to take based at least in part on the new arm choice policy and the second context data.

* * * * *